(12) United States Patent
Fukuda et al.

(10) Patent No.: US 6,552,986 B1
(45) Date of Patent: Apr. 22, 2003

(54) APPARATUS FOR RECORDING AND REPRODUCING DATA

(75) Inventors: Yasushi Fukuda, Odawara (JP); Kazuo Shigematsu, Yoshikawa (JP); Masahiko Takahashi, Yamanashi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/520,723

(22) Filed: Mar. 8, 2000

(30) Foreign Application Priority Data

Jan. 7, 2000 (JP) .................................. 2000-005862

(51) Int. Cl.$^7$ ................................................ G11B 7/00
(52) U.S. Cl. ................................ 369/53.37; 369/47.39
(58) Field of Search .......................... 369/47.39, 47.4, 369/47.41, 47.42, 47.45, 47.46, 53.2, 53.3, 53.37, 47.47

(56) References Cited

U.S. PATENT DOCUMENTS

| | | | | |
|---|---|---|---|---|
| 5,050,145 A | * | 9/1991 | Yoshida | 360/73.03 |
| 5,224,089 A | * | 6/1993 | Matsumura et al. | 369/47.33 |
| 5,805,548 A | * | 9/1998 | Ishihara et al. | 369/47.43 |
| 5,956,308 A | * | 9/1999 | Akahira et al. | 369/47.42 |
| 5,982,728 A | * | 11/1999 | Okamoto et al. | 369/47.45 |
| 5,986,988 A | * | 11/1999 | Kusano et al. | 369/47.41 |
| 6,026,068 A | * | 2/2000 | Obata et al. | 369/47.4 |
| 6,088,315 A | * | 7/2000 | Ando | 369/47.41 |
| 6,212,143 B1 | * | 4/2001 | Teshirogi et al. | 369/47.45 |

* cited by examiner

Primary Examiner—Thang V. Tran
(74) Attorney, Agent, or Firm—Antonelli, Terry, Stout & Kraus, LLP

(57) ABSTRACT

A data recording and reproducing apparatus includes a recording disabled state determining device for determining whether or not the optical disc is in a recording disabled state, in which the data recording and reproducing apparatus controls the rotation of the optical disc to increase a rotational speed during reproduction processing higher than the rotational speed during recording processing to reproduce data when the recording disabled state determining device determines that the optical disc is in the recording disabled state, thereby accepting a recording instruction and a reproduction instruction as required at any time, and avoids reproducing data at the same reproducing speed as a recording speed which is unnecessarily slower than the reproducing speed.

8 Claims, 4 Drawing Sheets

APPARATUS FOR RECORDING AND REPRODUCING DATA

BACKGROUND OF THE INVENTION

The present invention relates to an apparatus for recording and reproducing data using an optical disc as a recording medium.

Conventionally, data recording and reproducing apparatus using MO (Magneto Optical disc), CD-R (Compact Disc-Recordable), CD,-RW (Compact Disc-Rewritable), DVD-RAM (Digital Versatile Disc-Random Access Memory), and so on as a recording medium, have existed as data recording and reproducing apparatus using an optical disc as a recording medium.

These conventional data recording and reproducing apparatuses are capable of recording data on a recording medium as well as reproducing data from a recording medium, and may employ different processing speeds for data reproduction and data recording in consideration of a higher reliability of data recording, an increased transfer speed for transferring data to a device associated with reproduced data, and so on. Generally, since data recording is less reliable than data reproduction, the data recording speed is typically set lower than the data reproducing speed.

For example, some data recording and reproducing apparatus using CD-R and/or CD-RW as a recording medium may set the data reproducing speed higher than the data recording speed. Such a data recording and reproducing apparatus, when receiving a recording instruction from an associated device such as PC (Personal Computer), AV (Audio Visual) device, or the like, performs recording processing by starting a program for executing only the recording processing, so that it cannot perform reproduction processing. Conversely, upon receiving a reproduction instruction from an associated device, the data recording and reproducing apparatus performs reproduction processing by starting a program for executing only the reproduction processing, so that it cannot perform recording processing. Thus, data can be reproduced at the reproducing speed higher than the recording speed since the recording processing need not be taken into account during the data reproduction.

On the other hand, a data recording and reproducing apparatus using MO or DVD-RAM as a recording medium, unlike the above-mentioned data recording and reproducing apparatus, starts a program capable of executing both recording processing and reproduction processing upon receiving a recording instruction or a reproduction instruction from an associated device such as PC, AV device or the like, for the recording processing or the reproduction processing. When a recording instruction and a reproduction instruction are received as required at any time, as is the case with this data recording and reproducing apparatus, not only data recording processing but also data reproduction processing must be performed at a recording speed lower than a reproducing speed since it is unknown when a recording instruction or a reproduction instruction is received. This is because an improved reliability of data recording processing must be given a higher priority than an increased transfer speed for transferring reproduced data to an associated device or the like, and if the recording processing is performed at the reproducing speed higher than the recording speed, the data recording reliability is likely to be degraded.

As described above, conventional data recording and reproducing apparatus can accept a recording instruction and a reproduction instruction as required at any time, but cannot perform the reproduction processing at a reproducing speed higher than the recording speed.

SUMMARY OF THE INVENTION

It is an object of the present invention to provide an apparatus for recording and reproducing data, which is capable of accepting a recording instruction and a reproduction instruction as required at any time, and avoiding data reproduction processing unnecessarily performed at the same speed as a recording speed which is lower than a reproduction processing speed.

Representative constructions of the data recording and reproducing apparatus according to the present invention which achieve the above object are set forth below.

In a data recording and reproducing apparatus for recording and reproducing data while controlling the rotation of an optical disc, recording disabled state determining means is provided for determining whether or not the optical disc is in a recording disabled state, wherein the data recording and reproducing apparatus controls the rotation of the optical disc to increase a rotational speed of during reproduction processing higher than the rotational speed during recording processing to reproduce data, when the recording disabled state determining means determines that the optical disc is in the recording disabled state.

Also, in a data recording and reproducing apparatus for recording and reproducing data while controlling the rotation of an optical disc, control means is provided for comparing a first time period required for the reproduction processing when data is reproduced while a first rotation control is performed for the optical disc with a second time period required for the reproduction processing when data is reproduced from the optical disc while a second rotation control is performed for the optical disc to select the first rotation control for reproducing data when the first time period is shorter than the second time period, and to select the second rotation control for reproducing data when the second time period is shorter than the first time period.

Further, in a data recording and reproducing apparatus for reproducing and recording data while controlling the rotation of an optical disc in response to a reproduction instruction and a recording instruction issued from an associated device, control means is provided for selecting a first rotation control or a second rotation control for controlling the rotation of the optical disc based on the amount of data to be reproduced in response to the reproduction instruction, and for controlling the data recording and reproducing apparatus to perform the selected rotation control to reproduce data.

With the constructions described above, the data recording and reproducing apparatus of the present invention can accept a recording instruction and a reproduction instruction as required at any time, and can increase a transfer speed at which reproduced data is transferred to the associated device.

DESCRIPTION OF THE EMBODIMENTS

An embodiment of the present invention will hereinafter be described with reference to the accompanying drawings.

Figure 1:
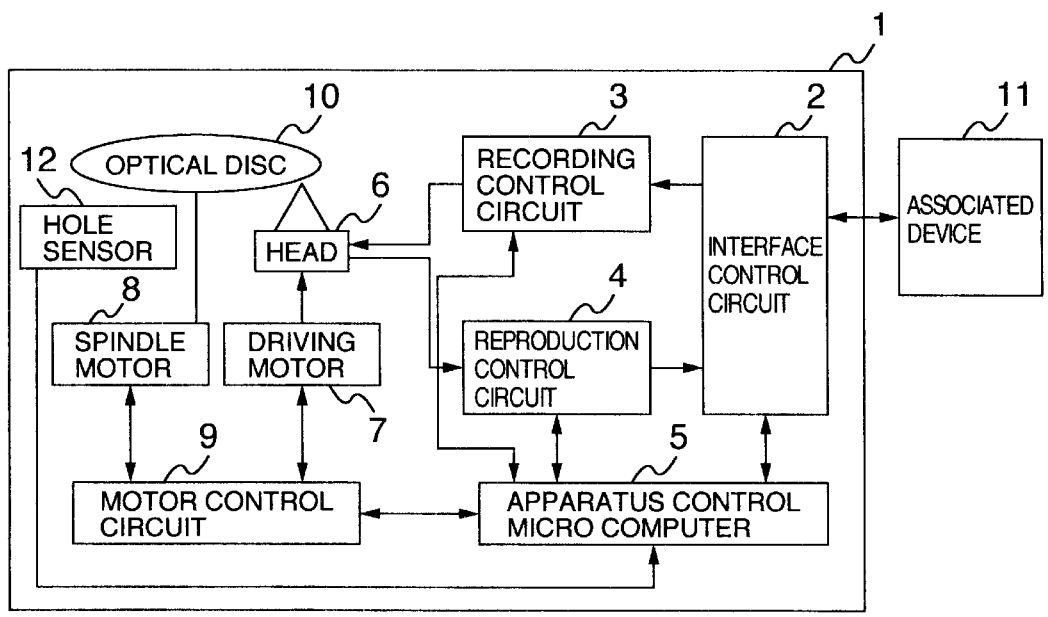
FIG. 1 is a block diagram generally illustrating the configuration of a data recording and reproducing system to which the present invention is applied.

FIG. 1 generally illustrates the configuration of a data recording and reproducing system to which the present invention is applied. Generally, a data recording and reproducing apparatus 1, to which the present invention is applied, starts a program capable of both data recording and reproduction processing (hereinafter simply called the "program") in accordance with a recording instruction or a reproduction instruction given from an associated device 11 such as PC, AV device or the like for performing data recording processing or data reproduction processing. The data recording and reproducing apparatus 1 comprises an interface control circuit 2; a recording control circuit 3; a reproduction control circuit 4; an apparatus control microcomputer 5; an optical head 6 for irradiating an optical disc 10 with light and detecting reflected light; a head movement driving motor 7 for moving the optical head 6 in a radial direction of the disc 10 (hereinafter simply called the "driving motor"); an optical disc rotating spindle motor 8 for rotating the optical disc 10 (hereinafter simply called the "spindle motor"); a motor control circuit 9 for controlling the driving motor 7 and the spindle motor 8; and a hole sensor 12.

The interface control circuit 2 receives recording data to be recorded on the optical disc 10 from the associated device 11; transmits reproduced data retrieved from the optical disc 10 to the associated device 11; and transmits and receives commands such as a recording instruction, a reproduction instruction and so on, to and from the associated device 11. The recording control circuit 3 modulates data received through the interface circuit 2 into recording data which is converted to be recordable on the optical disc 10 by the optical head 6. The reproduction control circuit 4 demodulates data read by the optical head 6 to reproduced data which can be sent to the associated device 11 through the interface circuit 2. The reproduction control circuit 4 also reproduces address information read by the optical head 6. The apparatus control microcomputer 5 starts the program in accordance with a recording instruction or a reproduction instruction to control the interface control circuit 2, the recording control circuit 3, the reproduction control circuit 4, and the motor control circuit 9. The optical head 6 records recording data received from the recording control circuit 3 on,the optical disc 10, and sends data read from the optical disc 10 to the reproduction control circuit 4. The function of the hole sensor 12 will be described later.

The data recording and reproducing apparatus 1 receives a recording instruction and data sent from the associated device 11 through the interface control circuit 2. After recognizing the received recording instruction, the apparatus control microcomputer 5 controls the motor control circuit 9. The motor control circuit 9 controls the driving motor 7 to move the optical head 6 to a target position at which recording data is to be recorded, and also controls the spindle motor 8 to control the rotational speed of the optical disc 10 at a value at which the recording processing can be performed. Then, the apparatus control microcomputer 5 instructs the recording control circuit 3 to start recording, thus recording the recording data modulated by the recording control circuit 3 at the target position of the optical disc 10 by irradiating the target position with light from the optical head 6. Upon completion of the recording processing based on the recording instruction, the apparatus control microcomputer transmits a command to the associated device 11 through the interface control circuit 2 for indicating that the recording processing based on the recording instruction has been completed, followed by the termination of the recording processing.

The data recording and reproducing apparatus 1 also receives a reproduction instruction sent from the associated device 11 through the interface control circuit 2. After recognizing that the reproduction instruction has been received, the apparatus control microcomputer 5 controls the motor control circuit 9. The motor control circuit 9 moves the optical head 6 to a target position at which data to be reproduced is recorded, and controls the rotational speed of the optical disc 10 at a value at which the reproduction processing can be performed. Then, the apparatus control microcomputer 5 instructs the reproduction control circuit 4 to start reproducing the data at the target position of the optical disc 10, thus reading the data from the optical disc 10 by the optical head 6. The data read by the optical head 6 is demodulated to reproduced data by the reproduction control circuit 4, and sent to the associated device 11 through the interface control circuit 2. Upon detecting that the reproduced data has been transmitted to the associated device 11, the apparatus control microcomputer 5 terminates the reproduction processing by sending a command to the associated device 11 through the interface control circuit 2 for indicating that the reproduction processing based on the reproduction instruction has been completed.

Figure 2:
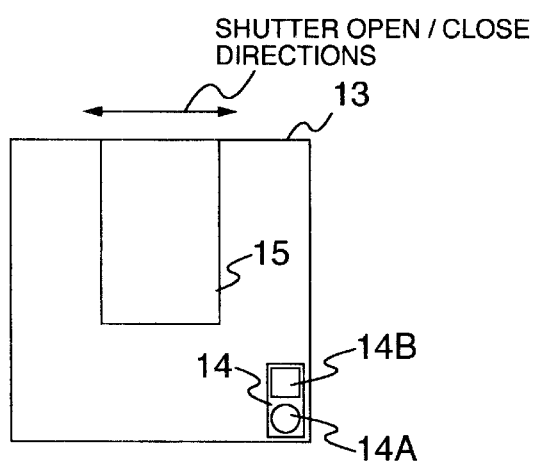
FIG. 2 is a schematic diagram illustrating the structure of a cartridge which accommodates an optical disc.

FIG. 2 illustrates a cartridge 13 which accommodates the optical disc 10. The cartridge 13 includes a disabled recording setting unit 14 which can be set to disable recording of data on the optical disc 10 accommodated in the cartridge 13. In this embodiment, a hole 14A provided on the cartridge and a lid 14B capable of closing and opening the hole 14A function as a disabled recording setting unit 14. In this embodiment, when the lid 14B is shifted to a position shown in FIG. 2 to open the hole 14A, the cartridge 13 is set into a recording disabled state. On the other hand, when the lid 14B is shifted to a hole closing position to close the hole 14A, the cartridge 13 is set into a recording enabled state. Of course, it goes without saying that the cartridge 13 may be in the recording enabled state when the hole 14A is open, and in the recording disabled state when the hole 14A is closed.

A shutter 15 is normally closed as illustrated, and is opened in a direction indicated by an arrow, when it is loaded into the data recording and reproducing apparatus 1, so that the optical disc 10 accommodated therein is exposed.

When the cartridge 13 is loaded in the data recording and reproducing apparatus 1, the recording disabled state determining unit 12, represented by a hole sensor as illustrated in FIG. 1, detects a disabled recording setting state set by the disabled recording setting unit 14 to output a detection signal to the apparatus control microcomputer 5 which determines whether or not the optical disc 10 loaded in the data recording and reproducing apparatus 1 is in a recording disabled state.

Figure 3:
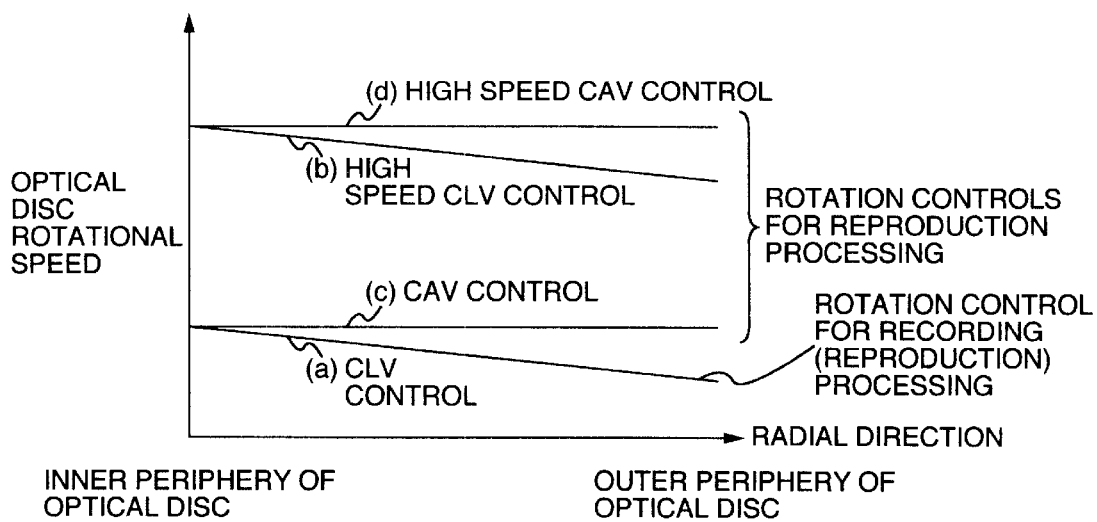
FIG. 3 is a graph for showing how an optical disc 10 is controlled for rotation during recording processing and reproduction processing.

FIG. 3 shows the rotation control for the optical disc 10 during the recording processing and the reproduction processing. As indicated by a curve (a) in FIG. 3, during the recording processing, a control for decreasing the rotational speed of the optical disc from the inner periphery to the outer periphery, i.e., a so-called CLV (Constant Linear Velocity) control is performed in order to record data over an area from the inner periphery to the outer periphery of the optical disc 10 substantially at the same data transfer speed. The CLV control may be implemented by a control scheme called "ZCLV" (Zoned Constant Linear Velocity) control, other than a control scheme which linearly decreases the rotational speed of the optical disc 10 as the optical head is moved toward the outer periphery of the optical disc 10. Specifically, the ZCLV control scheme divides the optical disc 10 into a plurality of regions in the radial direction from the inner periphery to the outer periphery, and decreases the rotational speed step-wisely from one region to another as the optical head approaches to the outer periphery. In the data recording and reproducing apparatus 1 according to this embodiment, any of the CLV control and ZCLV control may be employed for the recording processing.

Likewise, during the reproduction processing, the optical disc 10 may be rotated in accordance with the same CLV control as that during the recording processing to reproduce data therefrom, as indicated by the curve (a) in FIG. 3. However, since the reproduction processing is more reliable than the recording processing, the optical disc 10 may be rotated under the CLV control as indicated by a curve (b) in FIG. 3 at a higher rotational speed than the rotational speed during the recording processing to reproduce data (hereinafter, called the "high speed CLV control"). Alternatively, since it is preferable to reduce a time required to control the rotational speed of the optical disc 10 during the reproduction processing for faster reproduction processing, a so-called CAV (Constant Angular Velocity) control may be employed, as indicated by a curve (c) in FIG. 3, for rotating the optical disc 10 substantially at the same rotational speed from the inner periphery to the outer periphery of the optical disc 10. Further alternatively, for even faster reproduction processing, the CAV control may be performed to rotate the optical disc 10 at a higher speed than during the recording processing, as indicated by a curve (d) in FIG. 3, to perform the reproduction processing (hereinafter called the "high speed CAV control").

During the reproduction processing, the data recording and reproducing apparatus 1 according to this embodiment can select whether to perform the CLV control (including the ZCLV control) or otherwise a high speed rotation control such as the high speed CLV control, CAV control and high speed CAV control (hereinafter collectively called the "high speed rotation control").

It goes without saying that while FIG. 3 shows that the rotational speed on the inner peripheral side of the optical disc in accordance with the high speed CLV control is the same as the rotational speed on the inner periphery side of the optical disc in accordance with the high speed CAV control, they may not be the same.

Figure 4:
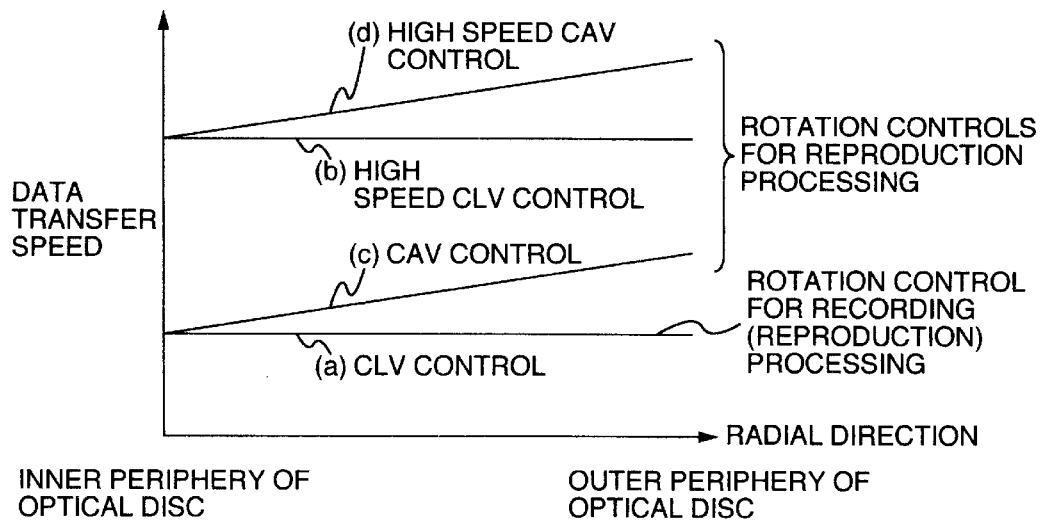
FIG. 4 is a graph showing the relationship between the rotation control for the optical disc 10 as shown in FIG. 3 and data transfer speeds during the recording processing and the reproduction processing.

FIG. 4 shows the relationship between the rotation control for the optical disc 10 as shown in FIG. 3 and the data transfer speeds during the recording processing and the reproduction processing. During the recording processing, since the CLV control is performed as indicated by the curve (a) in FIG. 3, data is recorded substantially at the same data transfer speed from the inner periphery to the outer periphery of the optical disc 10 as indicated by a curve (a) in FIG. 4.

On the other hand, when the CLV control is performed during the reproduction processing in the same manner as during the recording processing, the reproduction processing is performed at a data transfer speed as indicated by the curve (a) in FIG. 4, in the same manner as during the recording processing. When the high speed CLV control is performed during the reproduction processing, as indicated by the curve (b) in FIG. 3, instead of the CLV control, reproduced data can be transmitted to the associated device 11 at a higher data transfer speed than what is available with the CLV control, although the data transfer speed is substantially the same over the optical disc 10 from the inner periphery to the outer periphery, as indicated by a curve (d) in FIG. 4. Also, when the CAV control is performed as indicated by the curve (c) in FIG. 3, the data transfer speed for transferring reproduced data is increased as the optical head is moved from the inner periphery to the outer periphery of the optical disc 10, as indicated by a curve (c) in FIG. 4. Further, when the high speed CAV control is performed as indicated by the curve (d) in FIG. 3, the data transfer speed is increased as the optical head is moved from the inner periphery to the outer periphery of the optical disc 10, as indicated by the curve (d) in FIG. 4, and data is reproduced at a higher data transfer speed than what is available with the CAV control.

It can be understood from FIG. 3 and FIG. 4 that the reproducing speed can be higher than the recording speed by controlling the rotation of the optical disc 10 during the reproduction processing in accordance with the high speed control such as the high speed CLV control, CAV control or high speed CAV control instead of the CLV control.

Figure 5:
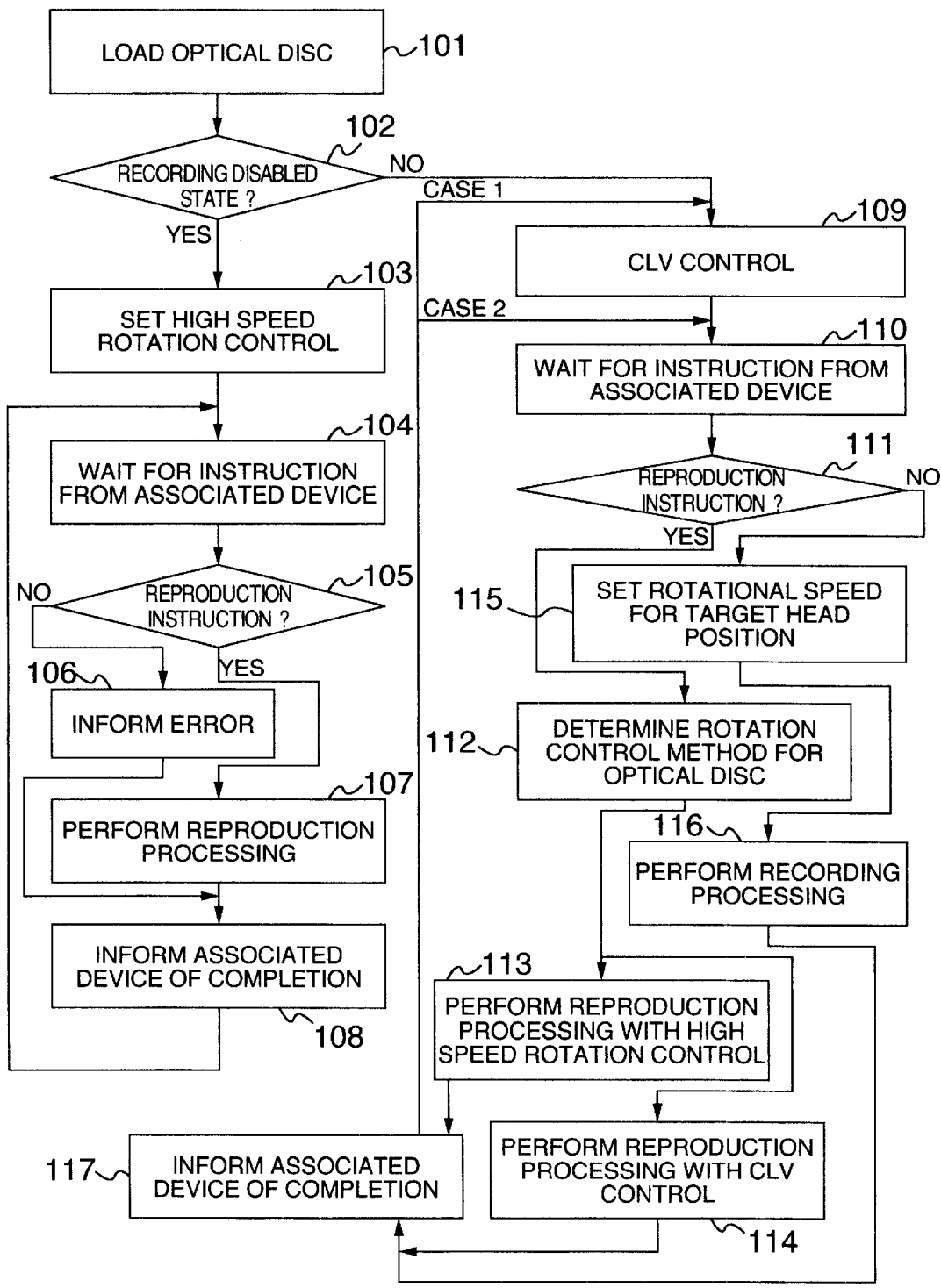
FIG. 5 is a flow chart illustrating a processing procedure for the recording processing and the reproduction processing performed in a data recording and reproducing apparatus 1.

FIG. 5 illustrates a processing procedure for the recording processing and the reproduction processing performed in the data recording and reproducing apparatus 1.

First, the cartridge 13 is loaded (or set) into the data recording and reproducing apparatus 1, and the optical disc 10 accommodated in the cartridge 13 is brought into a state in which data can be reproduced therefrom or recorded thereon (step 101).

Since a recording instruction and a reproduction instruction may be issued as required at any time from the associated device 11, the data recording and reproducing apparatus 1 must protect a recording disabled optical disc 10 from erroneous recording. For this purpose, the data recording and reproducing apparatus 1 confirms whether the optical disc 10 set in the data recording and reproducing apparatus is in a recording enabled state or a recording disabled state before it proceeds to a recording instruction or reproduction instruction waiting state (step 102). As mentioned above, the cartridge 13 has the hole 14A forming part of the disabled recording setting unit 14. The apparatus control microcomputer 5 determines whether the optical disc 10 is recording enabled or recording disabled by detecting whether the hole 14A is open or closed by the recording disabled state determining unit 12 represented by a hole sensor.

Since different branches are provided to be taken in the subsequent processing procedure depending on the determination result at step 102, the respective branches based on the respective determination results will be described below.

First, the processing procedure in the recording disabled state will be described.

When the set cartridge 13 is set in the recording disabled state by the disabled recording setting unit 14, no data recording processing need be performed. In other words, since the reliability of the data recording processing need not be ensured, the CLV control is not required. Thus, when the apparatus control microprocessor 5 determines at step 102 that the cartridge 13 is in the recording disabled state, the rotation control for the optical disc 10 is set to the high speed control (step 103), and the data recording and reproducing apparatus 1 waits for an instruction from the associated device 11 (step 104).

Upon receipt of an instruction from the associated device 11 through the interface control circuit 2, the apparatus control microcomputer 5 determines whether the received instruction is a recording instruction or a reproduction instruction (step 105).

If the instruction is a recording instruction, the apparatus control microcomputer 5 transmits a command to the associated device 11 through the interface control circuit 2 for indicating that the recording processing cannot be performed, since it has been known at step 102 that the cartridge 13 is set in the recording disabled state (step 106). Then, the apparatus control microcomputer 5 transmits a command to the associated device for indicating that the recording processing performed in response to the recording instruction is completed (step 108), and waits again for an instruction from the associated device 11.

On the other hand, when the received instruction is a reproduction instruction, the apparatus control microcomputer 5 controls the reproduction control circuit 4, the motor control circuit 9 and so on based on the reproduction instruction to reproduce data, while rotating the optical disc 10 under the high speed control, and transmits reproduced data to the associated device 11 through the interface control circuit 2 (step 107). As the transmission of the reproduced data is completed, the apparatus control microcomputer 5 transmits a command to the associated device 11 for indicating the reproduction processing performed in response to the reproduction instruction is completed (step 108), and waits again for an instruction from the associated device 11.

In the manner described above, since the data recording and reproducing apparatus 1 is configured to previously determine whether the optical disc 10 is in the recording disabled state or the recording enabled state, such that the high speed rotation control is performed instead of the CLV control when the optical disc 10 is set in the recording disabled state, the data recording and reproducing apparatus 1 can accept either of a recording instruction and a reproduction instruction as required at any time, and increase the data transfer speed for transferring reproduced data to the associated device.

Next, the processing procedure in the recording enabled state will be described.

When the loaded cartridge 13 is set in the recording enabled state by the disabled recording setting unit 14, the data recording and reproducing apparatus 1 must be able to support both a recording instruction and a reproduction instruction. Thus, when the apparatus control microcomputer 5 determines at step 102 that the cartridge 13 is in the recording enabled state, the apparatus control microcomputer 5 performs the CLV control after the cartridge 13 is loaded (step 109), and waits for an instruction from the associated device 11 (step 110).

Upon receipt of an instruction from the associated device 11 through the interface control circuit 2, the apparatus control microcomputer 5 determines whether the received instruction is a recording instruction or a reproduction instruction (step 111).

If the received instruction is a recording instruction, the apparatus control microcomputer 5 controls the motor control circuit 9 based on the recording instruction to move the optical head 6 to a target recording position above the optical disc 10, and performs the CLV control to set the rotational speed of the optical disc 10 at a value at which data can be recorded at the target recording position (step 115). Then, the apparatus control microcomputer. 5 controls the recording control circuit 3 to record data received through the interface control circuit 2 (step 116). Upon completion of the recording processing, the apparatus control microcomputer 5 transmits a command: to the associated device 11 for indicating that the recording processing performed in response to the recording instruction is completed (step 117), and waits again for an instruction from the associated device 11.

On the other hand, when the received instruction is a reproduction instruction, the apparatus control microcomputer 5 selects an appropriate rotation control method for the optical disc 10 based on the reproduction instruction, before entering the reproduction processing (step 112).

When selecting the high speed rotation control at step 112, the apparatus control microcomputer 5 controls the reproduction control circuit 4, the motor control circuit 9 and so on based on the reproduction instruction to reproduce requested data, while performing the high speed rotation control in accordance with the rotation control method selected at step 112, and transmits the reproduced data to the associated device 11 through the interface control circuit 2 (step 113).

When selecting the CLV control at step 112, the apparatus control microcomputer 5 controls the reproduction control circuit 4, the motor control circuit 9 and so on based on the reproduction instruction to reproduce requested data, while performing the CLV control, and transmits reproduced data to the associated device 11 through the interface control circuit 2 (step 114). When the transmission of the reproduced data is completed, the apparatus control microcomputer 5 transmits a command to the associated device 11 for indicating that the reproduction processing performed in response to the reproduction instruction is completed (step 117), and waits again for an instruction from the associated device 11.

For setting the data recording and reproducing apparatus 1 into a waiting state for waiting again for an instruction from the associated device 11 after step 117 is executed, the apparatus control microcomputer 5 controls the rotational speed of the optical disc 10 in accordance with the CLV control, and sets the data recording and reproducing apparatus 1 into the waiting state for waiting for a next instruction from the associated device 11 (case 1). As another option, it is also possible to set the data recording and reproducing apparatus 1 into a waiting state for waiting a next instruction while maintaining the same rotation control which has been performed during the reproduction processing based on the reproduction instruction or the recording processing based on the recording instruction (case 2). Whether to select case 1 or case 2 may be determined by instructing from the associated device 11 to the data recording and reproducing apparatus 1. Alternatively, the apparatus control microcomputer 5 may store the number of recording instructions and reproduction instructions previously received from the associated device 11, the order in which the instructions have been received, and so on, learn these data, and select an appropriate case based on the learning result.

In the following, the advantage of selecting an appropriate rotation control method at step 112 will be described.

For executing the reproduction processing based on a reproduction instruction, data must be reproduced after the optical disc 10 has been driven at a predetermined rotational speed while the optical head 6 has been moved to a location from which the reproduction processing is started. Thus, for increasing a data transfer speed for transferring requested data to the associated device, it is necessary not only to simply reduce a time required to reproduce data but also to reduce, as much as possible, a time required to move the optical head 6, and a rotational speed setting time required to set the rotational speed for the optical disc 10. Assuming that a reproduction processing time based on a reproduction instruction is Ta; a time required to move the optical head 6 is Tb; the rotational speed setting time for the optical disc 10 is Tc; and a data reproduction time is Td, the relationship among these times is expressed by the following equations:

$$Ta=Tb+Td \text{(where } Tb \geq Tc\text{)}$$

$$Ta=Tc+Td \text{(where } Tc \geq Tb\text{)}$$

For example, as a larger amount of data must be reproduced in response to a reproduction instruction, a higher speed rotation control results in a larger reduction in the data reproduction time Td required for the reproduction. Assuming therefore that a particular rotation control method is selected by the apparatus control microcomputer 5 based on the amount of data to be reproduced. Preferably, the apparatus control microcomputer 5 may calculate the amount of reproduced data, subjected to the reproduction processing, in response to a reproduction instruction, such that the high speed rotation control is selected when the amount of reproduced data exceeds a predetermined amount. The amount of reproduced data can be calculated from a reproduction start address and a reproduction end address included in the reproduction instruction, and a data recording density of the optical disc 10. Generally, the data recording density is previously defined in an associated standard such as CD, DVD, so that the data recording density associated with the used medium may be previously stored in the apparatus control microcomputer 5.

As described above, the data recording and reproducing apparatus of the present invention can accept a recording instruction and a reproduction instruction as required at any time by selecting an appropriate rotation control method based on the amount of reproduced data subjected to the reproduction processing in accordance with a received reproduction instruction, and can increase the data transfer speed for transferring reproduced data to the associated device.

As will be understood, if the high speed rotation control is performed to increase the data reproduction processing speed, for example, by a factor of two, the data reproducing time Td will be reduced to one-half. In this event, however, if the rotational speed setting time Tc taken to set the rotation speed required to double the data reproduction processing speed rises up to twice the rotational speed setting time Tc taken for the CLV control, the reproduction processing time Ta may be shorter when the high speed rotation control is not performed. Particularly, when a small amount of data is reproduced, and accordingly the data reproduction time Td is not so long, the selection of the high speed rotation control may result, on the contrary, in a longer reproduction processing time Ta.

For the reason set forth above, at step 512, a rotation control method which provides a shorter reproduction processing time Ta is selected in order to increase the transfer speed for transferring reproduced data.

Figure 6:
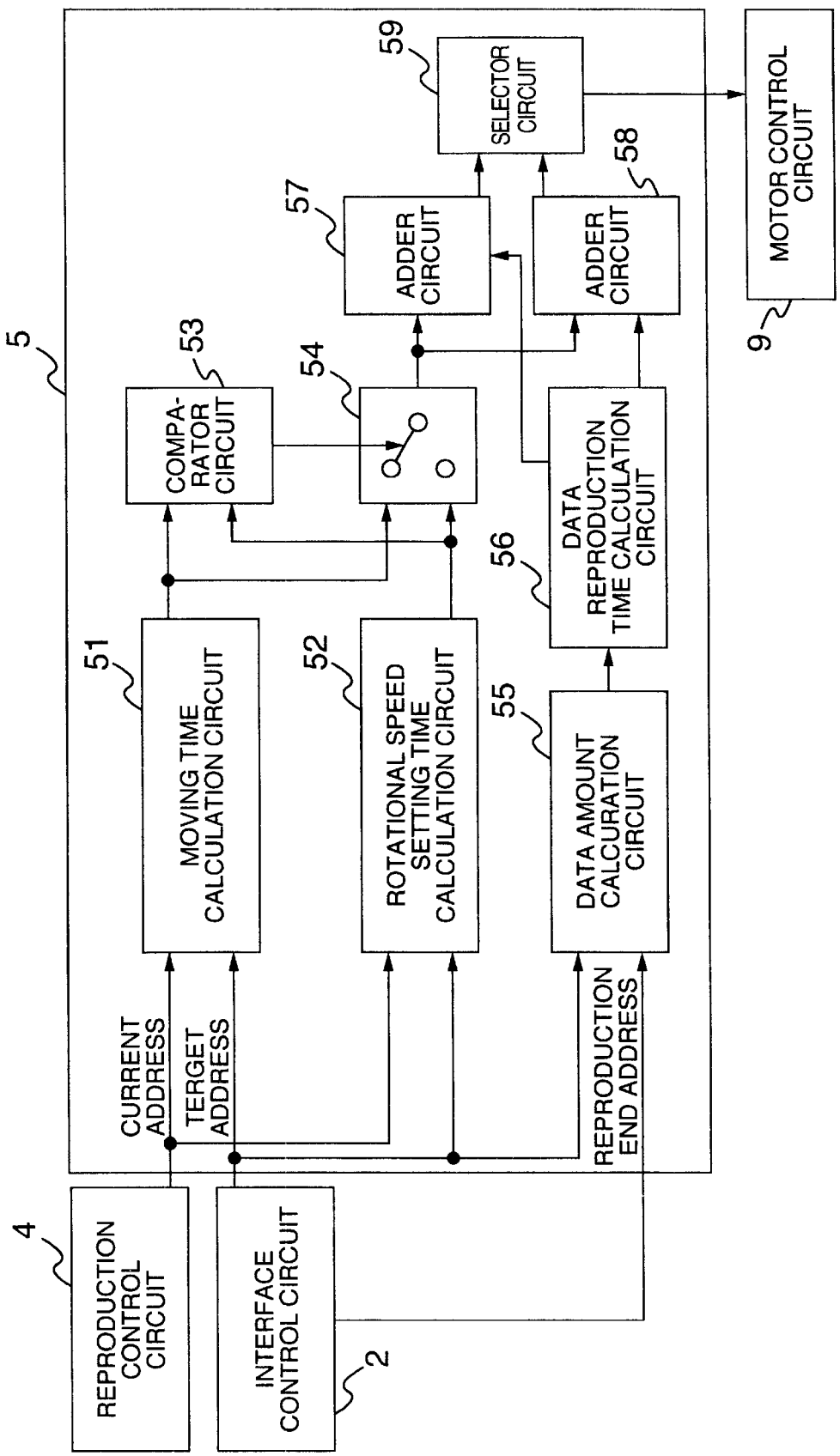
FIG. 6 is a block diagram illustrating the configuration of a portion of an apparatus control microcomputer which is related to a selection of a rotation control method.

FIG. 6 illustrates a block diagram of a portion of the apparatus control microcomputer 5 which is related to the selection of an appropriate rotation control method.

Upon receipt of a reproduction instruction through the interface control circuit 2 from the associated device 11, the position of the optical head 6 with respect to the optical disc 10 (current address) is read from the optical disc 10 by the optical head 6, and reproduced by the reproduction control circuit 4. A moving time calculation circuit 51 calculates a moving time T1 required for the optical head 6 to execute the reproduction instruction based on the reproduced current address, and a target address included in the information in the reproduction instruction sent through the interface control circuit 2. While the calculation of the moving time T1 also requires the knowledge of the torque characteristics of the driving motor 7 in addition to the current address and the reproduction start address (target address) from which the reproduction is started in response to the reproduction instruction, the apparatus control microcomputer 5 has the torque characteristics of the driving motor 7 previously stored therein, so that the moving time calculation circuit 51 can calculate the moving time T1.

Also, a rotational speed setting time calculation circuit 52 calculates a rotational speed setting time T2 required to set the rotational speed of the optical disc 10 to a value at which the reproduction instruction can be executed, based on the current address and the target address. While the calculation of the rotational speed setting time T2 also requires the knowledge of the torque characteristics of the spindle motor 8 in addition to the current address and the target address from which the reproduction is started, the apparatus control microcomputer 5 has the torque characteristics of the spindle motor 8 previously stored therein, so that the rotational speed setting time calculation circuit 52 can calculate the rotational speed setting time T2.

A comparator circuit 53 compares the moving time T1 calculated by the moving time calculation circuit 51 and the rotational speed setting time T2 calculated by the rotational speed setting time calculation circuit 52, and controls a switch circuit 54 to output a signal indicative of the longer time to an adder circuit 57 and an adder circuit 58.

A data amount calculation circuit 55 in turn calculates the amount of data to be reproduced when the reproduction processing is performed in response to the reproduction instruction, based on the target address, and a reproduction end address included in the information in the reproduction instruction sent through the interface control circuit 2. While the calculation of the amount of data to be reproduced requires the knowledge of the data recording density of the optical disc 10, in addition to the target address and the reproduction end address at which the reproduction processing performed in response to the reproduction instruction should be terminated, the data recording density is previously defined by the associated standard such as CD, DVD, the data amount calculation circuit 55 can calculate the amount of data to be reproduced.

A data reproduction time calculation circuit 56 calculates data reproduction times required to reproduce data based on the reproduction instruction for two cases, relying on the amount of data calculated by the data amount calculation circuit 55. Specifically, the data reproduction time calculation circuit 56 calculates a data reproduction time T3 required when the CLV control is performed, and a data reproduction time T4 required when a high speed rotation control is performed other than the CLV control, respectively. While the calculation of the data reproduction times requires the knowledge of the rotational speed of the optical disc 10 when the reproduction processing is performed, in addition to the amount of data to be reproduced, the apparatus control microcomputer 5 has previously stored therein the respective rotational speeds of the optical disc 10 when the CLV control and higher speed rotation controls are performed, so that the data reproduction time calculation circuit 56 can calculate the data reproduction time.

The adder circuit 57 adds the longer one of the moving time T1 and the rotational speed setting time T2 to the data reproduction time T3 to calculate a reproduction processing time T5 which is required from the start to the end of the reproduction processing performed in response to the reproduction instruction. The adder circuit 58 adds the longer one of the moving time T1 and the rotational speed setting time T2 to the data reproduction time T4 to calculate a reproduction processing time T6 which is required from the start to the end of the reproduction processing performed in response to the reproduction processing.

A selector circuit 59 compares the time T5 with the time T6 to determine the shorter one. When the time T5 is shorter, which indicates that the reproduction processing performed in accordance with the CLV control will result in a shorter reproduction processing time, the selector 59 selects the CLV control and controls the motor control circuit 9 accordingly. On the other hand, when the time T6 is shorter, which indicates that the high speed rotation control will provide a shorter reproduction processing time, the selector circuit 59 selects the high speed rotation control and controls the motor control circuit 9 accordingly.

As described above, the apparatus control microcomputer 5 calculates a reproduction processing time required when the CLV control is performed, and a reproduction processing time required when the high speed rotation control is performed, in response to a reproduction instruction, and selects a rotation control method which provides a shorter reproduction processing time, so that the data recording and the reproducing apparatus 1 can accept a recording instruction and a reproduction instruction as required at any time, and can increase a transfer speed for transferring reproduced data to the associated device.

In the foregoing embodiment, the data recording and reproducing apparatus 1 is configured to record and reproduce data to and from the optical disc 10 accommodated in the cartridge 13, and the recording disabled state determining unit 12 checks a setting state of the disabled recording setting unit 14 to determine whether the optical disc 10 is recording disabled or recording enabled. Alternatively, the present invention can also be applied to a data recording and reproducing apparatus which records and reproduces data to and from an optical disc that is not accommodated in a cartridge, in which case similar effects to those in the foregoing embodiment can be produced. In this case, a setting state indicating whether or not a particular optical disc is recording disabled or recording enabled may be recorded on the optical disc itself as information, such that the information is read from the optical disc to determine the setting state before receiving any instruction from the associated device 11.

Also, in the foregoing embodiment, the data recording and reproducing apparatus 1 is adapted to perform the reproduction processing in response to a reproduction instruction from the associated device 11 and perform the recording processing in response to a recording instruction. Alternatively, the data recording and reproducing apparatus 1 may be additionally provided with a recording instruction input unit for inputting a recording instruction thereto, and a reproduction instruction input unit for inputting a reproduction instruction thereto, such that the apparatus control microcomputer 5 recognizes a recording instruction and a reproduction instruction from the respective input unit to perform the recording processing and the reproduction processing accordingly. In this configuration, similar effects to those of the foregoing embodiment can also be produced.

Further, in the foregoing embodiment, while the data recording and reproducing system is configured of the data recording and reproducing apparatus 1 and the associated device 11, the data recording and reproducing apparatus 1 may be provided with an imaging unit such as CCD, a voice collecting unit such as a microphone, a display unit such as a liquid crystal display, and/or an audio output unit such as a speaker, such that the data recording and reproducing apparatus 1 itself may function as a self-contained data recording and reproducing system. In this configuration, images taken by the imaging unit and voices collected by the voice collecting unit are recorded on the optical disc 10 as recording data, data reproduced from the optical disc 10 is displayed on the display unit as images and outputted from the audio output unit as voices. In regard to inputting a recording instruction and a reproduction instruction, the data recording and reproducing apparatus 1 may be provided with a recording instruction input unit for inputting a recording instruction, and a reproduction instruction input unit for inputting a reproduction instruction, such that the apparatus control microcomputer 5 recognizes a recording instruction and a reproduction instruction from the respective input unit, causing the data recording and reproducing apparatus 1 to perform the recording processing and the reproduction processing. In this configuration, similar effects to those of the foregoing embodiment can also be produced.

It goes without saying that the apparatus control microcomputer 5 in the foregoing embodiment is not limited to the configuration as illustrated in FIG. 6, and may be implemented in software as well as in hardware.

The data recording and reproducing apparatus of the present invention can accept a recording instruction and a reproduction instruction as required at any time, and can increase a transfer speed at which reproduced data is transferred to the associated device.

What is claimed is:

1. A data recording and reproducing apparatus for recording and reproducing data while controlling the rotation of an optical disc, comprising:

control means for comparing a first time period required for reproduction processing when data is reproduced while a first rotation control is performed for said optical disc, with a second time period required for the reproduction processing when data is reproduced from said optical disc while a second rotation control is performed for said optical disc, to select said first rotation control for reproducing data when said first time period is shorter than said second time period, and to select said second rotation control for reproducing data when said second time period is shorter than said first time period.

2. A data recording and reproducing apparatus according to claim 1, wherein:

said first rotation control is a CLV control, and said second rotation control is a high speed CLV control, a CAV control or a high speed CAV control.

3. A data recording and reproducing apparatus according to claim 2, wherein:

said CLV control is performed when data is recorded.

4. A data recording and reproducing apparatus according to claim 1, wherein:

said data recording and reproducing apparatus performs said reproduction processing in response to a reproduction instruction from an associated device, and performs said recording processing in response to a recording instruction from said associated device.

5. A data recording and reproducing apparatus according to claim 4, wherein:

said control means calculates said first time from the longer time of an optical head moving time and a control time required for performing said first rotation control, and a data reproduction time required for reproducing data in accordance with said first rotation control, and calculates said second time from the longer time of said optical head moving time and a control time required for performing said second rotation control, and a data reproduction time required for reproducing data in accordance with said second rotation control.

6. A data recording and reproducing apparatus according to claim 1, wherein:

said control means switches to said first rotation control, after said control means has reproduced data while performing said second rotation control.

7. A data recording and reproducing apparatus according to claim 1, wherein:

after said control means has reproduced data while performing said second rotation control, said control means determines whether said control means switches to said first rotation control or continuously performs said second rotation control.

8. A data recording and reproducing apparatus according to claim 1, further comprising:

recording disabled state determining means for determining whether or not said optical disc is in a recording disabled state, wherein said data recording and reproducing apparatus controls the rotation of said optical disc to increase a rotational speed during reproduction processing higher than the rotational speed during recording processing to reproduce data when said recording disabled state determining means determines that said optical disc is in the recording disabled state.

* * * * *